Sept. 13, 1966    R. E. ROBERSON    3,271,884
MEANS OF TEACHING A FOREIGN LANGUAGE
Filed Nov. 25, 1964    4 Sheets-Sheet 1
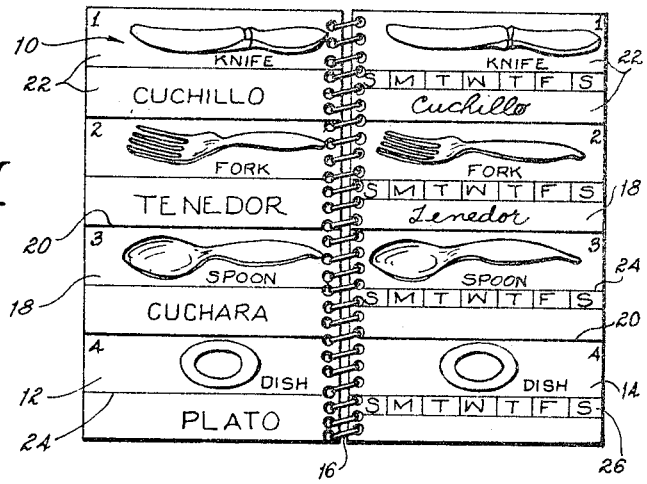
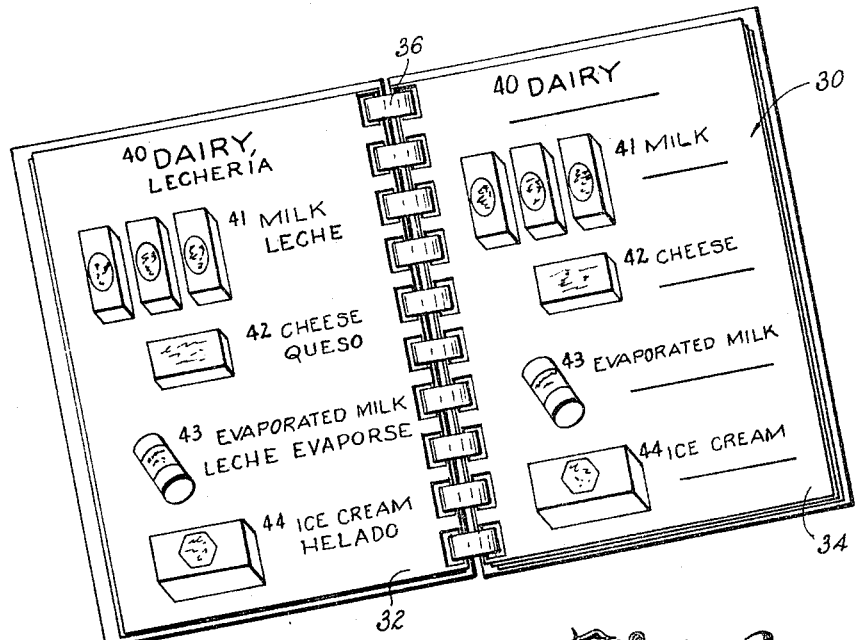
INVENTOR.
Robert E. Roberson
BY William S. Dorman
ATTORNEY

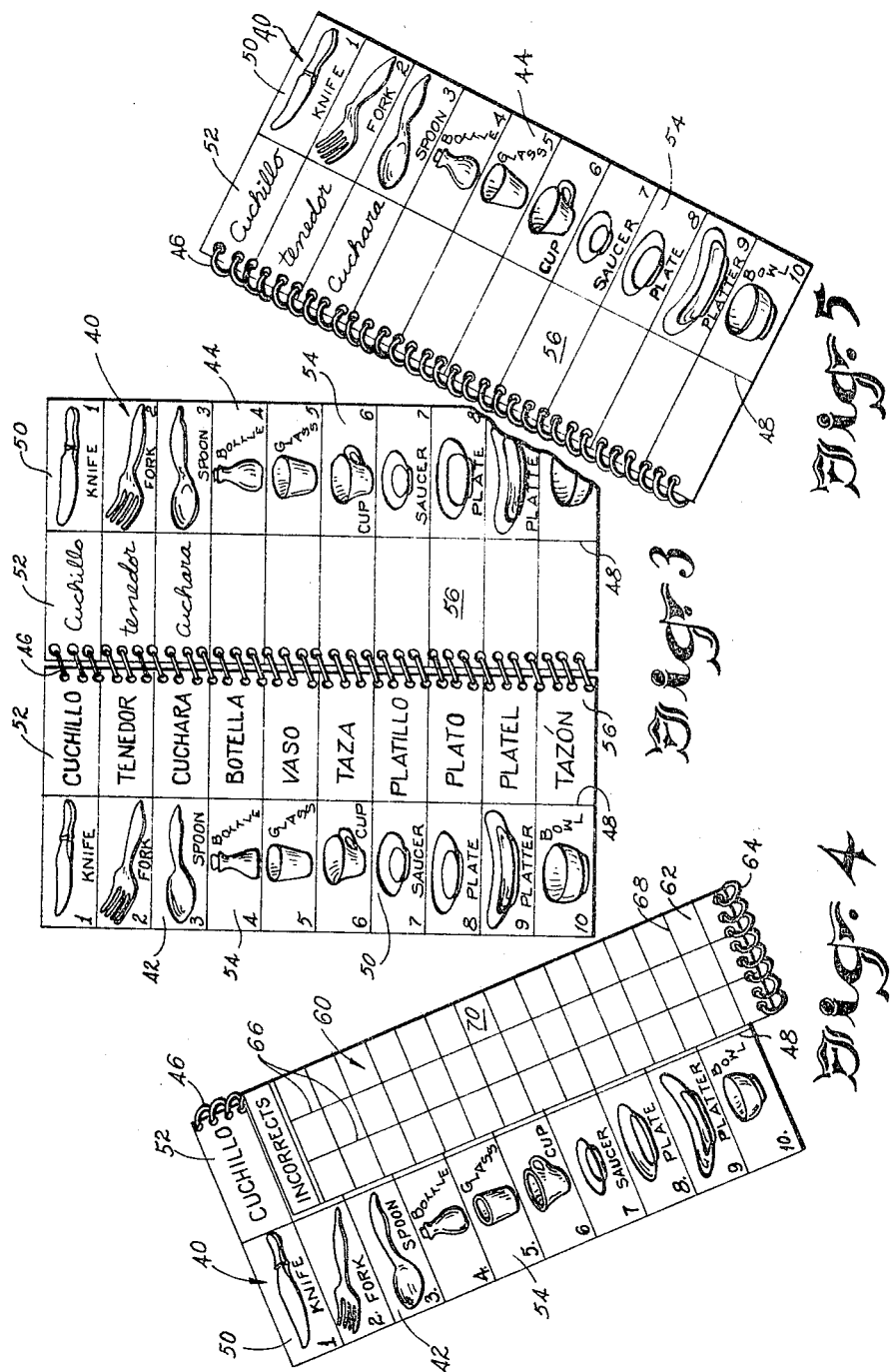

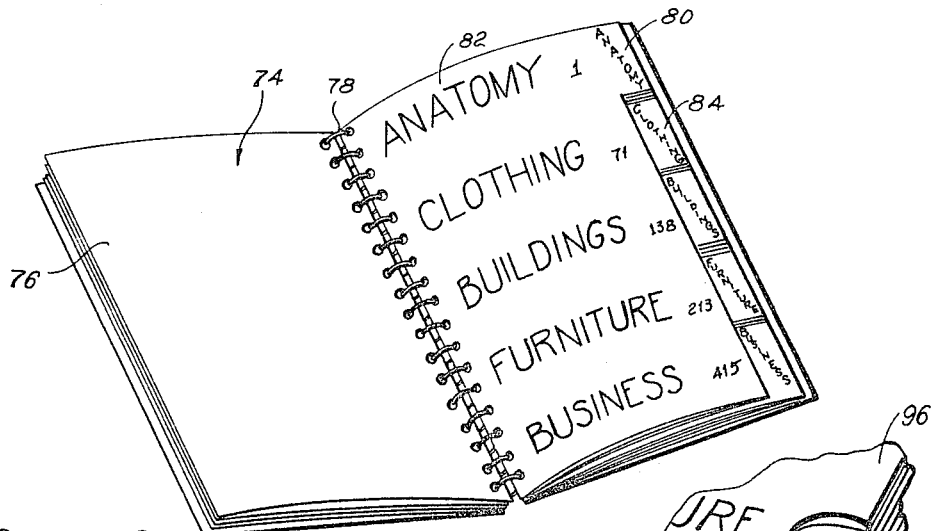
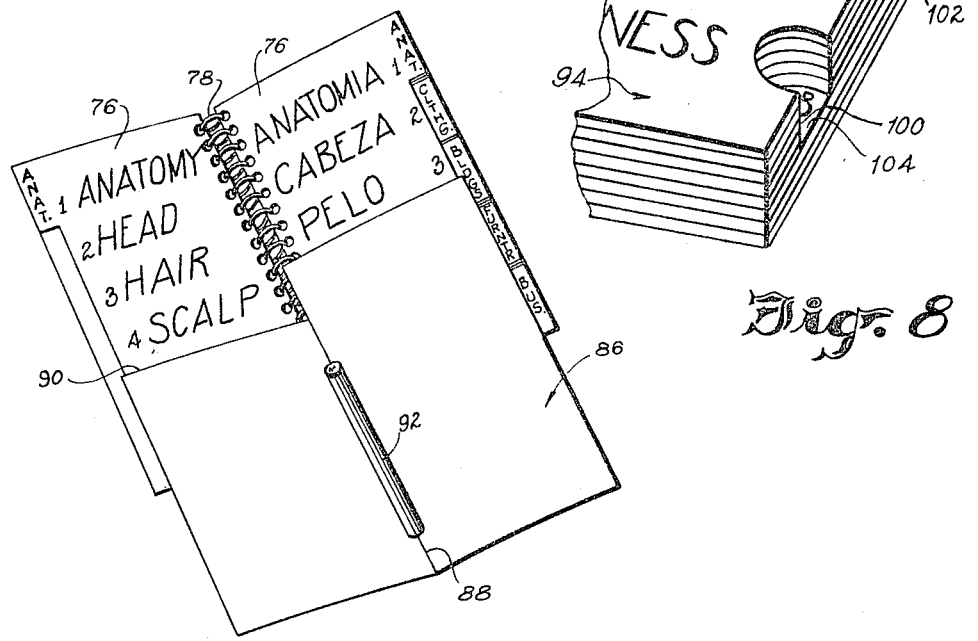

United States Patent Office 3,271,884
Patented Sept. 13, 1966

3,271,884
MEANS OF TEACHING A FOREIGN LANGUAGE
Robert E. Roberson, 507 E. Zion Place, Tulsa, Okla.
Filed Nov. 25, 1964, Ser. No. 419,627
4 Claims. (Cl. 35—35)

This invention relates to improvements in methods and means for teaching a foreign language, and more particularly, but not by way of limitation, to a method and means for teaching a foreign language wherein words are arranged in categories or classifications whereby words of related subject matter may be learned in connection with each other; and this application is a continuation-in-part of my presently pending application Serial Number 189,- 595, filed April 23, 1962, now abandoned.

The teaching of a foreign language today normally consists of the utilization of textbooks and teaching methods wherein there is no organization of subject matter of any kind in the teaching of the words of the language. The lessons usually involve many indirect teaching methods, such as diagramming of sentences and a multitude of grammar lessons or studies, and the like, none of which have any particular classification or systematic relationship. There are many disadvantages to the present day language teaching methods in that the seemingly endless myriad of rules and unrelated words often reduce the original enthusiasm of the student and may somewhat injure his self-confidence.

It is a widely accepted concept today that for any course of study to be learned through a natural method, or more naturally, it is desirable that the course be, first of all, elementary. For example, a baby is not taught long and complicated grammar facts before he is taught to talk. The talking comes first, in a natural manner, and the formal grammar matters are taught subsequently thereto. The arrangement of items in accordance with classified or categorized subject matter has proven to be extremely helpful and valuable in many every day situations, and it has been found that such a method is a great improvement over any disconnected arrangement of the items. For example, the arrangement of merchandise in super markets, or department stores, or the like, is widely in accordance with related items being stocked or stored on adjacent shelves for facilitating the merchandising thereof. In addition, the ease of finding an unknown listing in the classified section of a telephone book as contrasted with attempting to find a similar listing in the alphabetized section thereof, which is not a subject matter categorized system, clearly illustrates the advantages of a classification in accordance with related subjects. The present day disjointed, unorganized, and unsystemized methods of teaching a foreign language often results in the fact that the language is either never learned at all, or if learned, may be quickly forgotten.

The present invention contemplates a novel method and means for facilitating the teaching or self-instruction of a foreign language. It is well known in memory studies that a classification method greatly facilitates the developing or improving of the memory. The present invention utilizes this concept by arranging the words of the language in categories or classifications in accordance with a common subject matter. In other words, the words to be learned, or taught, are arranged in such a manner that the words are relevant to each other, or allied together through a common subject, or have some mutual connection therebetween. For example, a category classified as "Water" may be arranged to contain such words as brook, stream, tributaries, lakes, rivers, oceans, seas, and the like. It will be readily apparent that each word is thus closely associated with the remaining words in the category which greatly facilitates the learning or teaching of the entire group.

In addition, the groupings or classifications of words are arranged on a study device or teaching aid structure whereby the words may be more readily scanned for the initial learning thereof, or for review. The entire structure cooperates with the classifications of the various word groups not only to facilitate the teaching or self-learning of the language, but also to permit the words to be readily reviewed or studied, with particular assistance provided for checking the memory of the student in order to determine how well the lessons have been learned. The teaching aid is of a size and construction particularly adapted for ease of carrying in a pocket, or the like, of the student whereby ready reference thereto is always possible. In this manner, relatively short periods of study and review may be accomplished at substantially any time, such as when waiting for an appointment, or during television commercials, or other relatively short time periods which are normally considered as wasted time. The novel study aid and teaching method are simple and efficient and greatly facilitate both the initial learning of a foreign language and the retention thereof.

It is an important object of this invention to provide a novel method and means for facilitating the teaching and self-instruction of a foreign language through the utilization of particularly selected memory aids.

It is another object of this invention to provide a novel method and means for facilitating the teaching of a foreign language by arranging the words to be learned in categories of related subject matters.

Another object of this invention is to provide a novel means for facilitating the study of a foreign language whereby relatively short time periods of normally wasted time may be utilized for reviewing or study purposes.

Still another object of this invention is to provide a novel means for facilitating the learning of a foreign language wherein self-testing of prelearned knowledge may be readily accomplished, and a record thereof kept for future references for indicating areas requiring additional studying.

A further object of this invention is to provide a novel method and means for facilitating the teaching and self-learning of a foreign language which is simple and efficient in application.

Other and further objects and advantageous features of the present invention will hereinafter more fully appear in connection with a detailed description of the drawings in which:

FIGURE 1 is a front elevational view of a teaching aid embodying the invention.

FIGURE 2 is a front elevational view of a modified form of the teaching aid embodying the invention.

FIGURE 3 is a front elevational view of still another form of a teaching aid embodying the invention with a portion thereof broken away for purposes of illustration.

FIGURE 4 is a front elevational view of the teaching aid depicted in FIGURE 3 particularly depicting the device in use.

FIGURE 5 is still another view of the teaching device depicted in FIGURE 3 and showing the device in still another manner of use.

FIGURE 6 is a perspective view of still another form of a teaching aid embodying the invention.

FIGURE 7 is a perspective view of the device shown in FIGURE 6, particularly depicting the device in use.

FIGURE 8 is a broken perspective view of a portion of still another type of a teaching aid embodying the invention.

Figure 9:
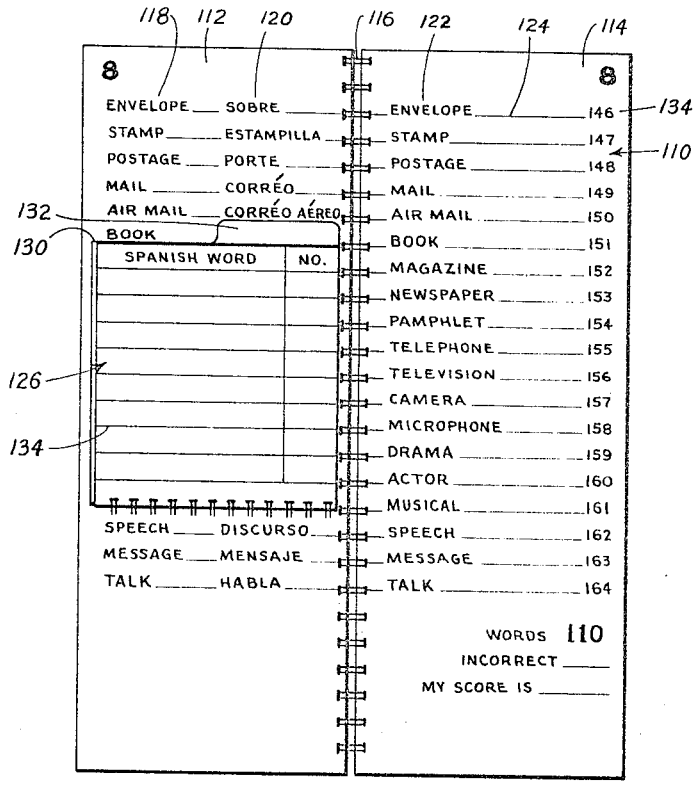
FIGURE 9 is an elevational view of an additional modification of a teaching aid embodying the invention.

Referring to the drawings in detail, and particularly FIGURE 1, reference character 10 generally indicates a teaching aid or study guide device comprising a plurality of individual sheets or pages such as shown at 12 and 14. The sheets are bound together at the adjacent edges thereof with a suitable spiral binding 16, or the like, whereby the sheets may lay flat in an open position thereof, as particularly shown in FIGURE 1. The spiral binding 16 also permits the sheets 12 and 14 to be folded completely forwardly or rearwardly in such a manner that the two adjacent pages or sheets will not be visible or viewed simultaneously, as is well known in this type of binding construction. Thus, the device 10 may be utilized either in the full open position, as depicted in FIGURE 1, or in the completely folded position (not shown) whereby only one of the sheets 12 or 14 may be viewed at a time, for a purpose as will be hereinafter set forth.

Each pair of facing or adjacent pages 12 and 14 contained within the teaching aid 10 are suitably imprinted or provided with substantially similar information relating to the language to be learned. For example, as shown in FIGURE 1, each page 12 and 14 is divided into four substantially equal sections 18, each separated from the other by a relatively heavy transversely extending line 20. Each of the sections or divisions 18 is further divided into two substantially equal portions 22 by a transversely extending line 24, which is preferably somewhat lighter than the lines 20. It is to be understood, however, that the distinction between the lines 20 and 24 may be accomplished by utilizing different colors in lieu of the variance of line thickness, if desired, or the lines 20 and 24 may be substantially identical. The right hand page 14 may be further provided with a plurality of smaller boxes or sections 26 adjacent each of the lines 24, if desired, whereby days of the week may be indicated therein for facilitating record keeping of the study period.

Each alternately spaced section 22 on each page 12 and 14 is provided with both a picture and the basic language spelling of the article depicted therein, such as the English word as clearly shown in FIGURE 1. On each of the left hand pages 12, the intermediate or remaining alternate sections 22 are provided with the foreign word corresponding to the English or basic language word. However, on each right hand page 14, the alternate or intermediate sections 22 are left blank whereby the student may write the foreign word corresponding to the pictorial and basic language showing immediately thereabove. It is to be further noted that each picture printed or provided on both pages 12 and 14 is provided with a numerical reference, each picture of a different article being provided with a separate individual number, whereas, pictures of the same article are always provided with the same reference numeral. In addition, all of the words of the language to be learned are arranged in a systemized order in the teaching aid device 10 whereby words of a generally similar subject matter are classified together for facilitating the association thereof during learning of the language.

When using the teaching aid device 10 for self-learning, or for teaching of a foreign language, the words being learned may be studied from the pages 12. Then, in order to test the actual knowledge gleaned, or how much has been learned, the book 10 may be folded about the spiral binding in such a manner that the right hand pages 14 only may be viewed. The student may then write the foreign words corresponding to the pictured English or basic language word in the blank or empty sections 22 therebelow. Of course, the student may also mentally supply the missing foreign word, if desired, in lieu of writing the word in the blank section.

In order to check himself, the corresponding page 12 may be referred to upon completion of the memory testing of the student. The days of the week indicated on the pages 14 may be checked off or marked in any desired manner for facilitating a record keeping of the time spent, or the day utilized for the particular study, if desired. Of course, it is preferable that the teaching aid 10 be of a size for carrying in a shirt pocket, or the like, for ready reference thereto during relatively short periods of time normally considered as wasted time.

Of course, in addition to finding the desired word listings under the particular or related category, the words may also be listed in an index in accordance with the numerical reference thereto, instead of by page number, since it has been found preferable to leave the pages of the book 10 unnumbered. The index may indicate that a particular category, for example Water, includes words numbered 1 through 50, or whatever range of numbers happens to cover the word grouping, thus facilitating the finding of the desired word, or word category.

The novel means and method of teaching or self-teaching of a foreign language through utilization of the teaching aid device 10 not only utilizes the improved memory feature of a systemized or categorized arrangement of the subject matter to be learned, but also provides a visual aid in utilizing both a pictorial representation and the basic word, such as the English word for the object to be learned. The combination of word arrangement and pictorial representation of the words being taught has been found to greatly increase the speed with which a student can learn a foreign language. For example, a student has been found to be able to learn a sufficient number of words of a foreign language for conversing understandably in the language in a time period of forty hours. Of course, after learning of the desired number of foreign words, grammar and technical matters can be taught in the usual manner for further increasing the student's overall knowledge of the language.

Modified structure

Referring now to FIGURE 2, a modified teaching aid device 30 is depicted which comprises a plurality of sheets or pages 32 and 34 which have the adjacent edges bound together by a suitable spiral type, or ring type binding 36, as is well known, whereby the sheets 32 and 34 may be fully opened or lay substantially flat, as shown in the drawings, or may be folded completely forwardly or rearwardly as hereinbefore set forth for exposing the adjacent sheets 32 and 34 for separate or independent viewing. The adjacent pages 32 and 34 are provided with photographs or pictorial representations of a systemized or classified assortment of articles arranged in accordance with a common subject matter. For example, dairy products are shown in FIGURE 2, and a grouping of such items as may be associated with a dairy, such as milk, cheese, ice cream, and the like, are assembled in the pictorial representation. The adjacent pages 32 and 34 are provided with substantially identical pictures showing the same products or articles. However, it is to be noted that the items depicted on page 32 are provided with both the basic, or English name and the related foreign language word, whereas, the items or articles depicted on the corresponding page 34 are provided only with the basic language word, leaving a blank space for the foreign word. In addition, the pictured articles are provided with the word reference numeral, as set forth in the preferred embodiment, whereby reference may be made to the words by their respective word number.

In order to study the words the student desires to learn, the page 32 having the particular words, including both the basic language and the foreign language words, may be studied at will. Then, to test the memory of the student, or the knowledge attained, the book 30 may be folded whereby only the page 34 selected may be viewed independently of the corresponding page 32. The foreign language words may be compared with the correct words by opening the book to the full open position shown in FIGURE 2 for readily ascertaining which words were entered erroneously on page 34, if any.

Another teaching aid 40 is depicted in FIGURES 3, 4 and 5 which is somewhat similar to that of the preferred embodiment. The book or teaching device 40 comprises a plurality of sheets 42 and 44 having the adjacent edges bound together by means of a suitable spiral binding 46, as hereinbefore set forth. The pages 42 and 44 are substantially identical, and are each provided with a centrally disposed longitudinally extending line 48 dividing each of the pages 42 and 44 into two longitudinally extending sections 50 and 52. It is to be noted that the sections 50 are both disposed at the outermost edge portions of the pages 42 and 44, whereas, the sections 52 are inwardly disposed therefrom. Each section 50 is provided with a plurality of boxes or sections 54 having a picture of an article provided therein. In addition to the pictorial representation of the article, the basic language word, as in this instance English, is provided in association therewith, along with the particular word reference numeral. As hereinbefore set forth in the preferred embodiment, the articles pictured in the boxes 54 are systematically arranged in accordance with a selected subject matter, and the two columns or sections 50 are substantially identical.

Each section 52 is provided with a plurality of boxes or sections 56 corresponding to the boxes 54. The boxes 56 of the page 42 are provided with the foreign word corresponding to the representation provided in the associated box 54. However, the sections or boxes 56 of the page 44 are blank. The student using the device 40 may study the words given or provided on the page 42 and in order to check his knowledge, the book 40 may be folded in such a manner that only the page 44 is visible, as shown in FIGURE 5, and the student may write the foreign words in the blank boxes 56, as shown in the top three boxes of FIGURES 3 and 5.

In addition, a mental review of the words on page 42 may be achieved by folding the book 40 in such a manner that only the particular page 42 thereof under study is visible, as shown in FIGURE 4. In this instance, a study aid 60 may be utilized. The study aid 60 comprises a plurality of sheets or pages 62 bound together at one end by a spiral binding 64. The sheets or pages 62 are preferably of a size corresponding to the size of the column or section 52, and are suitably ruled or imprinted with a plurality of spaced longitudinally extending lines 66 and a plurality of spaced transversely extending lines 68 whereby a plurality of boxes or sections 70 are provided on each sheet 62.

When the student desires to mentally review or test his knowledge of the foreign words, the study aid 60 may be superimposed over the column 52 of the page 42 with the spiral binding 64 positioned below the desired sheet 42, with the remainder of the pages of the study aid 60 disposed rearwardly of the device 40. The sheet 62 covers the printed foreign words in the column 52, and the student may test his knowledge or skill at remembering the correct word for the desired pictorial showing of column 50. The boxes 70 may be utilized for noting the reference numeral of the words which were not known, or were inaccurate. The sheet 62 may be readily moved downwardly to successively uncover the correct foreign words for providing the student's answers.

FIGURES 6 and 7 depict still another teaching aid device generally indicated at 74. Here again, the device is provided with a plurality of pages or sheets 76 having the adjacent edges thereof bound together with a suitable spiral binding 78, as hereinbefore set forth. The words to be taught, or learned are arranged in categories in accordance with related subject matter to facilitate the memorization thereof by association. As particularly shown in FIGURE 6, for example, one category may be entitled Anatomy, and the sheets 76 containing the words of the category are arranged in sequential order with the outer edge thereof provided with suitable superimposed tabs 80. Thus, all pages or sheets containing words of this classification may be readily ascertained. In addition, all of the words arranged in the Anatomy category are associated with a reference number, as hereinbefore set forth, and the index sheets, such as shown at 82, is arranged to indicate that the words in that particular category begin with the numeral 1 and extend through number 70. This is indicated by the fact that the next category, such as Clothing, begins with the word number 71. Of course, the number of words contained in a particular category may be as desired.

The second category, as depicted herein, is Clothing, and each sheet 76 containing words of this classification are provided with superimposed tabs 84 whereby the group may be readily located. Of course, all of the word categories in the device 74 may be thus arranged and identified, as clearly shown in the drawings.

In order to facilitate the study of the device 74, a study guide 86 (FIGURE 7) is provided. The study guide 86 comprises a single sheet provided with a longitudinal fold 88, and of a size complementary to two adjacent sheets 76 of the device 74. The adjacent sheets 76 of the book 74 are provided with corresponding words in such a manner that the word in the basic language is imprinted on one sheet 76 with the complementary foreign word imprinted in alignment therewith on the opposite page 76. The study guide 86 is provided with a cut-away portion or recess 90 extending along the top edge thereof to the fold 88 whereby the basic word on the one page 76 will be exposed to view while the corresponding foreign word on the opposite page 76 will be obscured when the guide 86 is superimposed over the open book 74. Of course, the guide 86 may be moved downwardly or upwardly along the opened book 74 as desired for testing or checking the student's knowledge of the foreign words. In addition, a suitable pocket or tube portion 92 may be provided along the fold line 88 for receiving a pencil, or the like (not shown) whereby errors may be readily marked for future reference and to indicate that further study is needed. Furthermore, it is preferable that the overall construction of the device 74 and study guide 86 be such that the entire teaching device may be easily carried in a shirt pocket, or the like, for ready reference at all times.

FIGURE 8 depicts a modified indexing means for a teaching aid device 94 similar to that shown in FIGURES 6 and 7. In this modification, the sheets 96 of the book 94 are provided with recesses or cut-away portions as indicated at 98 and 100 for indication of a particular classification or category of words. Each of the sheets 96 of a particular category are similarly cut-away for ready reference of the entire grouping of words. The sheet at the beginning (or end) of a new category will not be cut-away at the same position as the sheets immediately preceding, but will be cut-away at a new position in accordance with the locating of the next category. The group of words in a particular category will be contained between the two adjacent sheets wherein the notches are changed in position, such as shown at 102 and 104.

Figure 10:
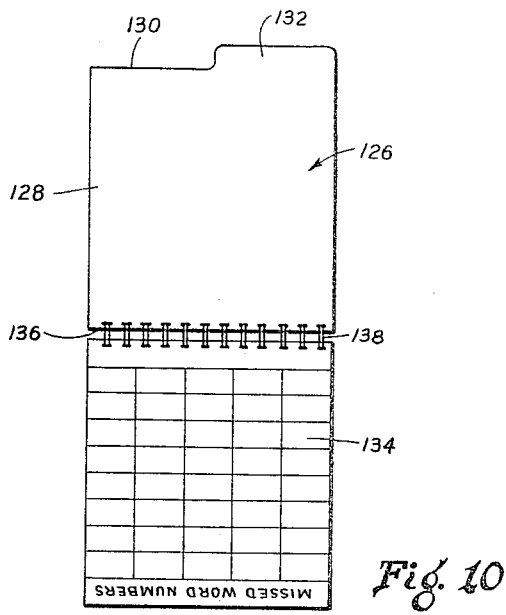
FIGURE 10 is a view of a study aid masking member which may be used with the embodiment depicted in FIGURE 9.

Referring now to FIGURES 9 and 10, the teaching aid 110 depicted therein is generally similar to the embodiment shown in FIGURES 3, 4 and 5 and comprises a plurality of sheets 112 and 114 having the adjacent edges bound together by a suitable circular wire binding or spiral binding 116 whereby the sheets may be rotated through a three-hundred and sixty degree revolution with respect to an adjacent sheet. In other words, the teaching aid 110 may be moved about the binding 116 in such a manner that two facing sheets 112 and 114 will be disposed in back to back relation similar to the showing in FIGURES 4 and 5. One of the sheets, such as 112, is provided with two spaced columns of words 118 and 120 with one of the columns, for example column 118, being words of the basic language and the other column, such as column 120, comprising words in the language being learned which correspond to the words of the basic language in column 118. The opposite page, such as 114, is provided with one column 122 containing words of the basic language with the second column 124 including blank spaces or lines wherein the corresponding word of the foreign language may be written by the student or user of the teaching aid 110.

The teaching aid 110 by itself is a convenient and efficient device for the self-instruction of a foreign language. The basic words contained in column 118 are disposed in substantial alignment with the corresponding word of the foreign language contained in the column 120 for facilitating studying of the words to be learned. The basic words contained in the column 122 are disposed in substantial alignment with the words of columns 118 and 120 and, of course, the lines or blank spaces in column 124 are in alignment with the basic words in column 122. Thus, when the teaching aid 110 is in an open position as shown in FIGURE 9, the language to be learned or words to be learned are readily visible for study. When it is desired to test the knowledge ascertained by the study, the sheets of the device 110 may be actuated or pivoted about the binding 116 in such a manner that only the page 114 is visible with page 112 being disposed in an opposite direction or in a reverse direction with respect to page 114. The student may then write the correct foreign word in the column 124 corresponding to the basic word in the column 122. Reopening of the device 110 to the position shown in FIGURE 9 permits a ready check of the test answers or words which have been written in the blanks in column 124.

A supplemental study aid generally indicated at 126 may be used in conjunction with the teaching aid 110, if desired. The device 126 comprises a flat member 128 constructed of any suitable opaque material such as heavy cardboard, plastic, or the like, and is adapted for disposition against one of the sheets such as 112 of the teaching aid 110. One edge of the flat member 128 is cut-away or provided with a recess 130 of a dimension substantially corresponding to the height of the lettering on the page 112 or 114. Thus, when the mask or flat member 128 is properly positioned on one of the sheets such as sheet 112 as shown in FIGURE 9, the basic word being studied will be visible in the recess portion 130 whereas the corresponding word of the foreign language will be obscured by the tab member 132 formed adjacent the recess 130. It will be readily apparent that the member 128 may be reversed in position on the sheet 112 whereby the tab 132 will obscure the word of the basic language in column 118 and permit visual inspection of the corresponding foreign word in the column 120. The combination of the member 128 with the teaching aid 110 provides an efficient self-testing apparatus. The study aid 126 is further provided with a plurality of sheets 134 secured to the edge portion 136 thereof oppositely disposed from the recess 130, the sheets 134 being secured to the edge 136 in any suitable manner such as circular or spiral binding 138 similar to the binding 116. Thus, the sheets 134 may be disposed in position against either flat surface of the member 138 depending upon the relative position of the member 138 with respect to the sheet 112.

The sheets 134 may be provided with suitable indicia thereon as shown in FIGURES 9 and 10 to permit recording of test results and in particular to indicate those words which have been missed and require further study. It is preferable that one side or surface of the sheets 134 be provided with indicia for facilitating the recording of a missed foreign language word, as shown in FIGURE 9, whereas the opposite side or surface of the sheets 134 may be provided with indicia facilitating recording of any missed basic language word, as shown in FIGURE 10. For example, when the device 126 is positioned on a sheet 112 as shown in FIGURE 9, the tab 132 obscures the foreign word and the basic word is visible through the recess 130. In this position for the device 126, the sheets 134 may be used for writing in the foreign language word which has been missed. Conversely, when the device 126 is reversed with respect to the sheet 112 whereby the basic language word is obscured and the foreign language word is visible, the missed basic language word may be recorded on the exposed sheet 134.

It is considered preferable that each of the basic language words contained in the device 110 be provided with a separate and individual index number such as shown at 134 in FIGURE 9. When recording the missed or erroneous basic language words on the sheet 134 on the device 126, it may be considered desirable to record only the number of the missed word without the necessity of writing in the entire word. Since the word numbers run consecutively in the device 110, it will be very easy to locate the missed words for further study and review. When entering the missed foreign language words on the sheets 134, it may be desirable to actually write in the missed word as well as the word number of the corresponding basic language word. The writing of the missed foreign language word is a further aid in the actual learning process and, of course, the word number of the corresponding basic word facilitates finding of the missed foreign language word in the device 110.

From the foregoing, it will be apparent that the present invention provides an improved means and method for teaching or self-instruction of a foreign language. The novel teaching aid is provided with categories or classifications of the foreign words arranged in accordance with related subject matter for greatly facilitating the learning thereof. In addition, the teaching aids are particularly designed and constructed for ease of utilization and for convenience in order that relatively short periods of time may be utilized which are normally considered to be wasted time. The arrangement of the foreign language words in a systematic manner greatly increases the ease of memorization for the foreign words, and the association of pictorial representations in combination therewith provides an improved result in both the rapidity with which the language may be learned, and also the retention thereof. Of course, recordings or other sound media may be used wherein the words are systematically arranged for facilitating the learning of the language. The novel method and means are simple and efficient in utilization.

Whereas, the present invention has been described in particular relation to the drawings attached hereto, it should be understood that other and further modifications, apart from those shown or suggested herein, may be made within the spirit and scope of this invention.

What is claimed is:

1. A teaching aid device for facilitating the self-instruction of a foreign language and which comprises a plurality of sheets, a circular binding means connecting the plurality of sheets whereby one portion of the sheets may be rotated through three hundred and sixty degrees with respect to the remaining portion of the sheets, each of said sheets being provided with information on each side thereof relating to the foreign language and a basic language corresponding thereto, said information being arranged in facing sheets with one of said facing sheets being provided with a column of basic words and a column of corresponding foreign words with each basic word being arranged in substantial alignment with the corresponding foreign word, the other of said facing sheets being provided with a column of basic words arranged in substantial alignment with a column of blank spaces, the basic words and blanks on the second mentioned facing sheet being in substantial alignment with the basic words and foreign words on the first mentioned facing sheet, said circular binding providing for positioning of each corresponding pair of facing sheets in substantial back to back relationship for facilitating self-testing of the learned words, independent opaque mask means slidably movable with respect to the sheets, said mask means comprising a substantially flat body portion having an outwardly extending tab provided on one edge thereof, said tab being arranged for obscuring the words of one column and permitting visual observation of the aligned word in an adjacent column, a plurality of recording sheets secured to the mask means in a manner permitting a three hundred and sixty degree rotation of the recording sheets whereby the recording sheets may be disposed on either of the opposed flat surfaces of the mask means.

2. A teaching aid device as set forth in claim 1 wherein the recording sheets are each provided with indicia on the opposite sides thereof whereby recording of information relative to the basic language may be inscribed on one side thereof and information relative to the foreign language may be inscribed on the opposite side thereof.

3. A teaching aid device for facilitating the self-instruction of a foreign language and which comprises a plurality of sheets, binding means connecting the plurality of sheets in a manner whereby one sheet may be rotated through three hundred and sixty degrees with respect to an adjacent sheet, each of said sheets being provided with information thereon relating to a foreign language and a basic language corresponding thereto, each pair of facing pages being provided with substantially identical information in the form of a column relating to one of said languages, only one of said facing pages being provided with a corresponding aligned column relating to the other of said languages, said binding means providing for alternate disposition of a pair of facing pages in a substantially co-planar position and in a back to back relationship whereby the entirety of both of said facing pages may be viewed in the said co-planar position and only one of said facing pages may be visually observed in said back to back relationship for facilitating self-testing of the learned information relating to the foreign language corresponding to the basic language.

4. A teaching aid device as set forth in claim 1 wherein a longitudinally extending tubular member is substantially centrally disposed on the mask for receiving a writing implement therein.

References Cited by the Examiner

UNITED STATES PATENTS

| | | | |
|---|---|---|---|
| 1,641,982 | 9/1927 | McDade | 35—75 |
| 2,200,146 | 5/1940 | Block | 281—30 |
| 2,234,075 | 3/1941 | Carolin | 35—35.5 X |
| 2,357,082 | 8/1944 | Carolin. | |
| 2,541,735 | 2/1951 | Albrecht | 281—42 |

FOREIGN PATENTS 25,249   7/1952   Finland.

EUGENE R. CAPOZIO, *Primary Examiner.*

LAWRENCE CHARLES, JEROME SCHNALL, W. GRIEB, *Examiners.*